US007280998B1

(12) United States Patent
Aboujaoude et al.

(10) Patent No.: US 7,280,998 B1
(45) Date of Patent: Oct. 9, 2007

(54) VIRTUAL DATA WAREHOUSING

(75) Inventors: Roger Aboujaoude, Ocean Township, Monmouth County, NJ (US); Hossein Eslambolchi, Los Altos Hills, CA (US); Frank Ianna, Franklin Lakes, NJ (US); Prakash Vasa, Clarksburg, NJ (US)

(73) Assignee: AT&T Corp., New York, NY (US)

( * ) Notice: Subject to any disclaimer, the term of this patent is extended or adjusted under 35 U.S.C. 154(b) by 482 days.

(21) Appl. No.: 10/896,440

(22) Filed: Jul. 22, 2004

Related U.S. Application Data

(60) Provisional application No. 60/490,682, filed on Jul. 28, 2003.

(51) Int. Cl.
G06F 17/30 (2006.01)
(52) U.S. Cl. .................. 707/1; 707/2; 707/10; 709/201
(58) Field of Classification Search ............. 707/1–10, 707/100–104.1, 200–206; 705/1, 39; 709/201
See application file for complete search history.

(56) References Cited

U.S. PATENT DOCUMENTS

| | | | |
|---|---|---|---|
| 6,014,670 A | 1/2000 | Zamanian et al. | |
| 6,178,418 B1 * | 1/2001 | Singer | 707/3 |
| 6,317,749 B1 | 11/2001 | Ghatate | |
| 6,480,836 B1 | 11/2002 | Colby et al. | |
| 6,604,104 B1 * | 8/2003 | Smith | 707/10 |
| 6,718,335 B1 | 4/2004 | Ball | |
| 6,779,030 B1 * | 8/2004 | Dugan et al. | 709/223 |
| 2003/0120593 A1 * | 6/2003 | Bansal et al. | 705/39 |
| 2004/0210452 A1 * | 10/2004 | Aboujaoude et al. | 705/1 |
| 2004/0249644 A1 * | 12/2004 | Schiefer et al. | 705/1 |

\* cited by examiner

Primary Examiner—Don Wong
Assistant Examiner—Hung Tran Vy
(74) Attorney, Agent, or Firm—Wendy W. Koba

(57) ABSTRACT

A virtual data warehouse (the functional equivalent of a conventional data warehouse) that provides aggregated views of the complete data inventory. The virtual data warehouse contains metadata, which is used to form a logical enterprise data model that is part of the database of record (DBOR) infrastructure. Each legacy back-end database system is published on the infrastructure, with its metadata extracted and used as noted above. The infrastructure software uses standard J2EE, JMS and reusable EJBs, for transactional unit requests, and ETL (extract-transform-load) tools for real-time bulk loading of data.

9 Claims, 1 Drawing Sheet

VIRTUAL DATA WAREHOUSING

CROSS REFERENCE TO RELATED APPLICATION

This application claims the benefit of Provisional Application Ser. No. 60/490,682, filed Jul. 28, 2003.

TECHNICAL FIELD

The present invention relates to data warehousing and, more particularly, to the creation of virtual data warehousing to quickly share large amounts of data across an enterprise in real time.

BACKGROUND OF THE INVENTION

Due to the increased amounts of data being stored and processed today, operational databases are constructed, categorized and formatted in a manner conducive for maximum throughput, access time and storage capacity. Unfortunately, the raw data found in these operational databases often exist as rows and columns of numbers and code that appears bewildering and incomprehensible to business analysts and decision makers. Furthermore, the scope and vastness of the raw data stored in modern databases renders it harder to analyze. As a result, applications have been developed in an effort to help interpret, analyze and compile the data so that it may be readily and easily understood. This is accomplished by mapping, sorting and summarizing the raw data before it is presented for display, allowing individuals to more easily interpret the data and make key decisions based on the collected data.

Extracting raw data from one or more operational databases and transforming it into useful information is the function of data warehouses. In data warehouses, the data is structured to satisfy decision support roles rather than operational needs. Before the data is loaded into the data warehouse, the corresponding source data from an operational database is filtered to remove extraneous and erroneous records, cryptic and conflicting codes are resolved, raw data is translated into meaningful information and summary data that is useful for decision support, trend analysis or other end-user needs is pre-calculated. In the end, the data warehouse is comprised of an analytical database containing data useful for decision support.

In large enterprises, different organizations have, over the years, developed their own data warehouses, often particular to the type of data used by that organization. As a result, the ability to obtain an "enterprise view" of the company's performance is a difficult task, requiring hours of human effort to coordinate and evaluate all of the data from each data warehouse. Additionally, as companies merge and/or acquire other companies, the back-end database systems associated with the merged and/or acquiring entities must be subsumed into the existing systems. This has become a cumbersome activity and an issue that needs to be addressed.

SUMMARY OF THE INVENTION

The need remaining in the prior art is addressed by the present invention, which relates to data warehousing and, more particularly, to the creation of virtual data warehousing to quickly share large amounts of data across an enterprise in real time.

In accordance with the present invention, a virtual data warehouse is developed that allows for aggregated views of data across a plurality of disparate back-end database systems, where these systems may be physically disparate and/or operationally disparate. Instead of physically transporting all of the data to an "actual" data warehouse, the virtual data warehouse of the present invention is formed through an infrastructure based on the flexible and industry standard Java 2 Platform, Enterprise Edition (J2EE), Java Message Service APIs (JMS) and reusable Enterprise Java Bean data components (EJB's) for transactional unit requests or real-time bulk loading using Extract-Transform-Load (ETL) technologies. The concept of the present invention thus facilitates a "customer-centric" business model, allowing for migration from the various product-, service- and network-centric "silos" that have been created over time.

The virtual architecture formed as a result of this infrastructure eliminates the complexities associated with the physical movement of data, reducing capital costs associated with warehousing, development and maintenance. The virtual data warehouse can also grow incrementally as more back-end systems are published over time, and their metadata is extracted and contributed to the continual derivation of the logical enterprise data model. Various views into the virtual data warehouse are based on this derived logical enterprise data model that hides the complexities of the various legacy back-end database systems.

Other and further advantages of the present invention will become apparent during the course of the following discussion and by reference to the accompanying drawing.

BRIEF DESCRIPTION OF THE DRAWING

The FIGURE illustrates an exemplary architecture incorporating the virtual data warehouse of the present invention.

DETAILED DESCRIPTION

Figure 1:
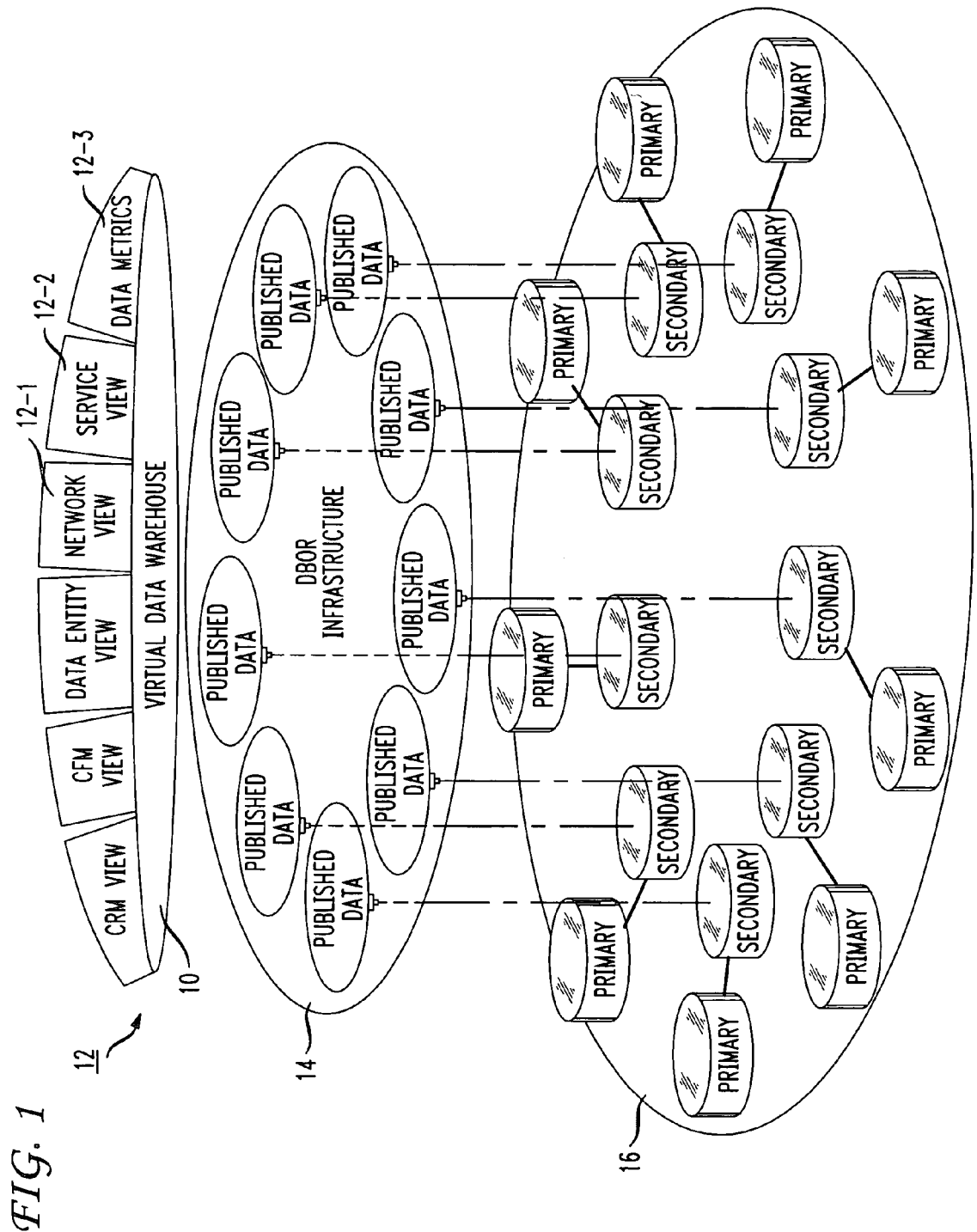

The sole FIGURE illustrates an arrangement for implementing a virtual data warehouse in accordance with the present invention. As shown, the arrangement defines a virtual data warehouse 10 that allows for a variety of different "views" of enterprise data to be retrieved, without physically creating any data warehouse—all of the information resides in each repository as originally created. The remainder of the present invention will be discussed in terms of the "enterprise" being a telecommunications service provider. It will be understood that the provision of a virtual data warehouse in accordance with the present invention may be used with any type of "enterprise", the telecommunications service provider chosen merely for the sake of example.

Referring to the FIGURE, virtual data warehouse 10 is illustrated as allowing for a plurality of different views 12 into the data, the views including a network view 12-1, service view 12-2, and data metrics view 12-3, among others. In accordance with the present invention, virtual data warehouse 10 interacts with database of record (DBOR) infrastructure 14 to query the various back-end legacy database systems 16 and extract the desired information. In particular a logical "enterprise data model" is created within DBOR infrastructure 14, based on metadata extracted from back-end systems 16. Advantageously, as more back-end systems are published on the infrastructure, the associated metadata is automatically extracted and used to supplement the enterprise data model, thus keeping the infrastructure and the enterprise data model as current as possible.

It is an aspect of the present invention that DBOR infrastructure 14 is implemented using the standard J2EE, JMS and reusable Enterprise Java Beans (EJB's) for transactional unit requests and real-time bulk loading. The loading uses Extract-Transform-Load (ETL) tools to provide a quick connectivity to all relational database-based back-end systems 16, extracting their metadata and building relationships across multiple databases 16 with minimal human intervention to assist in creating the logical enterprise data model. The capability to connect to the extracted metadata and perform automated data analysis using the ETL toolset thus quickly resolves the complexities associated with the analysis of legacy mainframe-based databases 16. The result is that the manual work historically associated with realizing a data warehouse is greatly minimized. As mentioned, the metadata is used in deriving the logical enterprise data model and is also used in modeling the EJB's for the transactional segment, thus increasing the reuse and reducing the costs and development time associated with traditional data warehouses.

Indeed, the virtual data warehouse architecture of the present invention eliminates the complexities of physically moving the data, as required in creating a traditional data warehouse, in addition to the capital costs associated with warehousing, including development and maintenance costs. The virtual data warehouse of the present invention can grow incrementally as more back-end database systems are published on the infrastructure, with their metadata extracted and contributed to the on-going derivation of the logical enterprise data model. In accordance with the present invention, therefore, the virtual data warehouse enables the quick and efficient migration from a "product"- and "service"-focused business model to an integrated "enterprise"-focused business model. As a result, projects that span across the entire enterprise and depend on accurate customer and business inventory can be rapidly and incrementally deployed as access to accurate data is provided via the virtual data warehouse.

The virtual data warehouse of the present invention also provides caching for back-end systems (which are not available 24 hours a day). The DBOR infrastructure facilitates rapid deployment of any new application with similar data needs, as the solutions are based on maximum reuse of EJBs. The virtual data warehouse concept will thereby enable the enterprise to integrate different business unit-specific IT structures rapidly and seamlessly without the need for physically disturbing each of the disparate IT infrastructure components.

While the present invention has been described in terms of a specific embodiment, those skilled in the art will recognize that the invention is so limited. Indeed, the principles of the present invention may be practiced with any type of enterprise, and modifications and alterations to the specifics described herein may be made and are considered to fall within the spirit and scope thereof, as identified by the claims appended hereto.

What is claimed is:

1. An arrangement for providing information to a plurality of different client views within an enterprise without creating an actual data warehouse, the arrangement comprising a virtual data warehouse including
   a plurality of disparate back-end database systems associated with a common enterprise, each back-end database system capable of having a different legacy architecture and organization;
   a database of record (DBOR) infrastructure for storing in a single physical location a plurality of metadata extracted from each back-end database system of the plurality of disparate back-end database systems so as to form a logical enterprise data module, the logical enterprise data module responsive to information requests from the plurality of different client views.

2. The arrangement as defined in claim 1 wherein the DBOR infrastructure further comprises extract-transform-load (ETL) tools for providing connection to the plurality of disparate back-end database systems.

3. The arrangement as defined in claim 1 wherein the DBOR infrastructure is dynamic and is further utilized to generates an updated logical enterprise data module as new database systems are published on the infrastructure.

4. The arrangement as defined in claim 3 wherein the metadata associated with newly published database systems is extracted and used to update the local enterprise data module within the DBOR infrastructure.

5. The arrangement as defined in claim 1 wherein the plurality of different client views includes at least one of the following views: customer, financial, data entity and data metrics.

6. The arrangement as defined in claim 5 wherein the plurality of different client views further includes at least one of the following view: product, service, network.

7. The arrangement as defined in claim 1 wherein the plurality of disparate back-end database systems are physically disparate.

8. The arrangement as defined in claim 1 wherein the plurality of disparate back-end database systems are organizationally disparate.

9. The arrangement as defined in claim 1 wherein the plurality of disparate back-end database systems are both physically and organizationally disparate.

* * * * *